US011595469B2

(12) United States Patent
Ferraro et al.

(10) Patent No.: US 11,595,469 B2
(45) Date of Patent: Feb. 28, 2023

(54) BALANCING DATA PARTITIONS AMONG DYNAMIC SERVICES IN A CLOUD ENVIRONMENT

(71) Applicant: RED HAT, INC., Raleigh, NC (US)

(72) Inventors: Nicola Ferraro, Rome (IT); Luca Burgazzoli, Piacenza (IT)

(73) Assignee: Red Hat, Inc., Raleigh, NC (US)

( * ) Notice: Subject to any disclaimer, the term of this patent is extended or adjusted under 35 U.S.C. 154(b) by 98 days.

(21) Appl. No.: 17/329,441

(22) Filed: May 25, 2021

(65) Prior Publication Data

US 2022/0385725 A1  Dec. 1, 2022

(51) Int. Cl.
*H04L 67/1001* (2022.01)
*G06F 9/50* (2006.01)

(52) U.S. Cl.
CPC ........ *H04L 67/1001* (2022.05); *G06F 9/5061* (2013.01); *G06F 9/5083* (2013.01)

(58) Field of Classification Search
CPC . H04L 67/1001; G06F 9/5061; G06F 9/5083; G06F 9/50
See application file for complete search history.

(56) References Cited

U.S. PATENT DOCUMENTS

| | | | | |
|---|---|---|---|---|
| 6,801,949 B1* | 10/2004 | Bruck | ...................... | H04L 61/25 709/234 |
| 6,813,637 B2* | 11/2004 | Cable | ...................... | H04L 67/34 709/201 |
| 7,293,255 B2* | 11/2007 | Kumar | ...................... | G06F 8/60 717/109 |
| 7,849,286 B2* | 12/2010 | Sugumar | ............. | G06F 9/45558 711/208 |
| 7,853,952 B2* | 12/2010 | Riddle | ...................... | H04L 9/40 718/104 |
| 7,886,039 B2* | 2/2011 | Popescu | ................ | H04L 12/185 709/224 |
| 8,392,482 B1* | 3/2013 | McAlister | ........... | G06F 16/1727 707/899 |
| 8,868,711 B2 | 10/2014 | Skjolsvold et al. | | |
| 2003/0037092 A1* | 2/2003 | McCarthy | ............. | G06F 9/5061 718/103 |
| 2014/0025770 A1* | 1/2014 | Warfield | ............... | G06F 16/256 709/213 |
| 2017/0169047 A1* | 6/2017 | Brewer | ................. | G06F 16/168 |
| 2018/0213441 A1* | 7/2018 | Mehta | ................. | H04W 28/085 |
| 2020/0322425 A1 | 10/2020 | Sharma et al. | | |
| 2021/0383404 A1* | 12/2021 | Edamadaka | .......... | G06F 9/5083 |

* cited by examiner

*Primary Examiner* — Sargon N Nano
(74) *Attorney, Agent, or Firm* — Womble Bond Dickinson (US) LLP

(57) ABSTRACT

A method includes identifying, by a first instance of a service, a first number of data partitions of a data source to be processed by the service and a second number of instances of the service available to process the first number of data partitions. The method further includes separating the first number of data partitions into a first set of data partitions and a second set of data partitions in view of the second number of instances of the service, determining a target number of data partitions from the first set of data partitions to be claimed by each of the second number of instances of the service, and claiming, by the first instance of the service, the target number of data partitions from the first set of data partitions and up to one data partition from the second set of data partitions.

20 Claims, 9 Drawing Sheets

BALANCING DATA PARTITIONS AMONG DYNAMIC SERVICES IN A CLOUD ENVIRONMENT

TECHNICAL FIELD

Aspects of the present disclosure relate to host systems in a container-orchestration system, and more particularly, to balancing data partitions among dynamic services in a cloud environment.

BACKGROUND

A container-orchestration system may support dynamically scalable services to support different workloads. Dynamically scalable services may instantiate instances of the service as necessary to process a particular workload. Therefore, data processing workloads can be distributed across several instances of the service.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
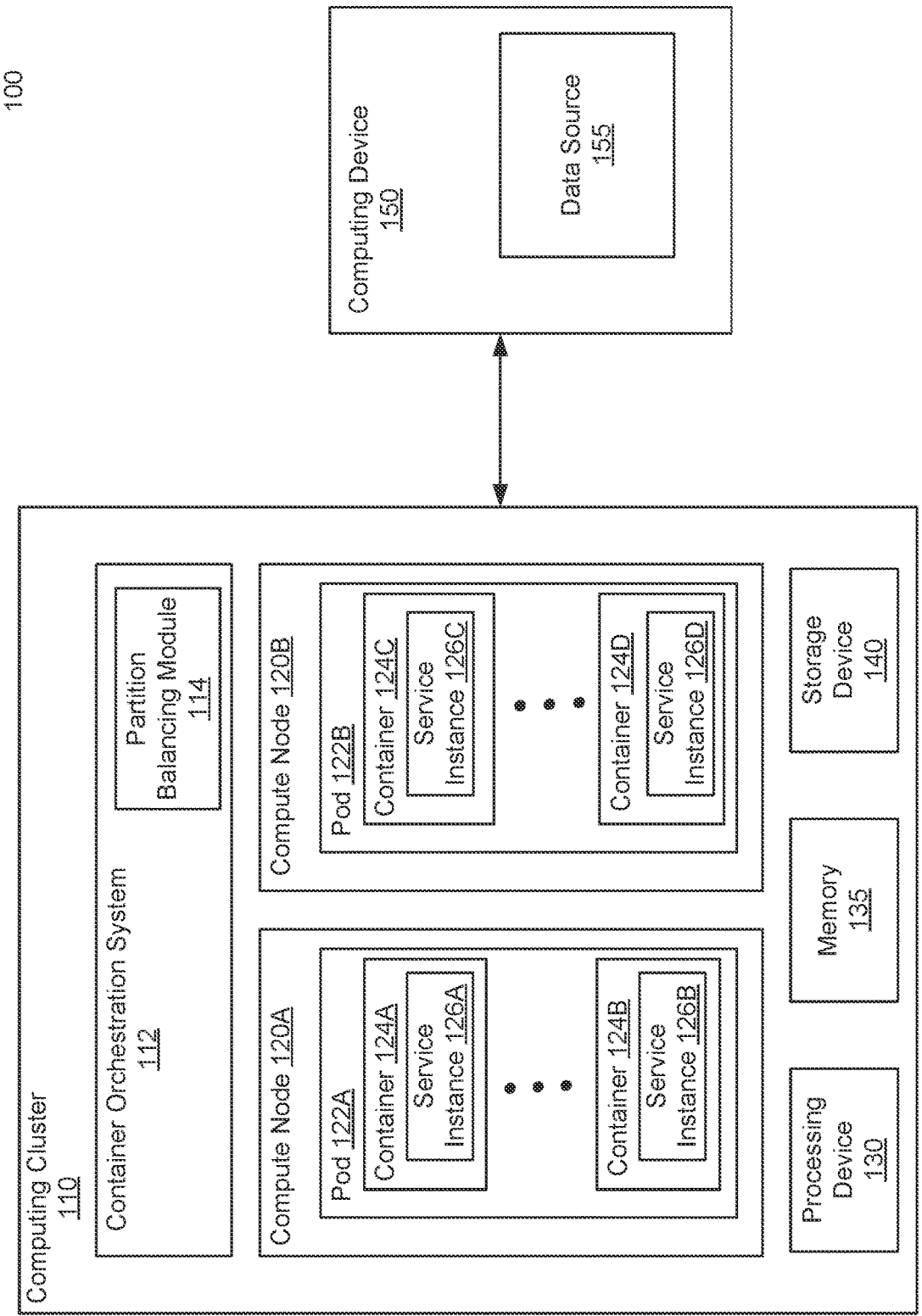
FIG. 1 is a block diagram that illustrates an example computer system architecture, in accordance with some embodiments of the present disclosure.

Dynamically scaled services running in cloud environments, such as serverless architectures, may be scaled up (e.g., instantiating additional service instances) to manage larger workloads. Additionally, dynamically scaled services may distribute the workload among instances of the service. Generally, when data is pushed to the services by external systems, load balancers (e.g., load balancers for hypertext transfer protocol (HTTP) workloads) or other methods may be used to balance data pushed to the service. However, in some circumstances data may be pulled by the service rather than pushed to the service from an external system. Balancing of data across service instances when pulling data may be difficult because coordination between the service instances may be necessary.

One conventional approach to balancing data across instances when pulling data by the several instances is to split the source data into partitions and assign each partition to a distinct instance of the service. Each instance may then process data only from the one or more partitions that the instance owns, thus parallelizing computation. In some conventional systems, an external source system (e.g., Apache Kafka) may implement, at protocol level, solutions for assigning partitions to consuming service instances and rebalancing them when the number of consumers changes. Accordingly, the source system may assume the role of a central point of coordination so that consumers of the source data may scale the service without regard to data contention and balancing. However, these conventional solutions for balancing a workload across instances may be special cases and may only apply in limited circumstances (i.e., processing data from a particular source system).

For example, a service may consume data from a remote file server (e.g., a file transfer protocol (FTP) server, network file system (NFS) directory, an Amazon S3 bucket, etc.). If the service is running two service instances, processing logic may perform an integer hash function of the file names and assign odd integer hash to one of the service instances and even integer hash to the other service instance. Other static methods may be used to distribute data processing across other fixed numbers of service instances.

However, the above described conventional approaches may only work with services having a fixed number of instances, and do not work with services that scale dynamically. For example, if two service instances are processing data and a third instance is added, the selection and assignment algorithm may need to be changed. Additionally, it may difficult to ensure that the same algorithm is used by each of the service instances and that the algorithm is changed at each service instance at the same exact time. Therefore, in some instances a partition may be assigned to more than one service instance at the same time which may result in duplicate processing and other inefficiencies or errors.

The present disclosure addresses the above noted and other deficiencies of conventional systems by providing decentralized balancing of data partitions among service instances of a dynamically scalable services in a cloud environment. In one example, processing logic (e.g., a partition balancing module) may be included in each service instance of a service. The partition balancing module may obtain information about the other service instances of the service (e.g., how many other service instances are executing) and information about data partitions of a data source (e.g., how many data partitions). The partition balancing module may then determine a maximum multiple of the number of service instances (referred to herein as the threshold multiple) and separate the data partitions into two groups: one group including the threshold multiple number of data partitions (referred to herein as the "main set" of data partitions) and one group including the remaining data partitions (referred to herein as the "remainder set"). The partition balancing module may then calculate a target number of data partitions to be acquired by the service instance by dividing the number of partitions in the main set by the number of currently executing service instances. The partition balancing module may attempt to acquire partitions from the main set until the service instance owns the target number of data partitions from the main set. Additionally, the partition balancing module may attempt to acquire at most one partition from the remainder set until each of the data partitions in the remainder set are owned by a service instance.

In one example, the partition balancing module may continuously or periodically determine the number of partitions and service instances and re-calculate the main set, remainder set, and target number. Accordingly, the partition balancing module for each service instance may determine whether the number of partitions from the main set owned by the service instance is more or less than the target number. If the number of partitions owned from the main set is less than the target number, the partition balancing module may attempt to acquire an additional data partition from the main set. If the number of partitions owned from the main set is greater than the target number (e.g., when additional service instances have been added), the partition balancing module may release one or more partitions until the number of partitions owned is equal to the target number.

In one example, each data partition is associated with a lease that can be claimed by a service instance. A lease may be provided by the cloud platform or any other external system. Only a single service instance may own the lease for each data partition at any given time. A lease may act as a lock that can be owned for a limited amount of time, during which the owning service instance may renew the lease or let it expire. Additionally, a service instance may yield the lease prior to expiration of the lease or if the service instance is inactive a timeout may release the lease to allow another instance to claim it. Such leases may be used to determine which service instances are to process a certain partition.

Decentralized balancing of data partitions among service instances of a dynamically scalable services in a cloud environment does not require balancing at the protocol level and is not based on a central coordinator. Accordingly, the solution is generalized to allow balancing of data partitions from any data source. Additionally, embodiments of the present disclosure avoid service downtime and always converges to an equal distribution of partitions, or at least a minimal variance distribution, among available service instances.

FIG. 1 depicts a component diagram of an example computer system architecture 100, in accordance with one or more aspects of the present disclosure. Computer system 100 includes computing cluster 110. Computing cluster 110 includes container orchestration system 112 to instantiate and manage containers and container workloads across one or more compute nodes 120A-B of the computing cluster 110. Compute nodes 120A-B may be physical host machines or virtual machines in communication with one another. For example, compute node 120A and 120B may each be a physical host machine. Alternatively, compute nodes 120A-B may each be a virtual machine executing on a single host machine or multiple host machines. Although FIG. 1 depicts only two compute nodes 120A-B, computing cluster 110 may include any number of compute nodes. Additionally, computing cluster 110 may include both physical host machines and virtual machines. The computing cluster 110 may include a processing device 130, memory 135, and storage device 140. Memory 135 may include volatile memory devices (e.g., random access memory (RAM)), non-volatile memory devices (e.g., flash memory) and/or other types of memory devices. Storage device 140 may be one or more magnetic hard disk drives, a Peripheral Component Interconnect (PCI) solid state drive, a Redundant Array of Independent Disks (RAID) system, a network attached storage (NAS array, etc. Processing device 130 may include multiple processing devices, storage devices, or devices. Processing device 160a, b may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also include one or more special-purpose processing devices such as an application specific integrated circuit (ASIC), a field programmable gate array (FPGA), a digital signal processor (DSP), network processor, or the like.

In one example, each compute node 120A-B may execute one or more pods (i.e., pod 122A of compute node 120A and pod 122B of compute node 120B). A pod may be a collection of one or more containers to execute a workload. For example, pod 122A may include one or more containers 124A-B each containing one or more service instances (i.e., service instances 126A-B). Similarly, pod 122B may include one or more containers 124C-D each container one or more service instances (i.e., service instances 126C-D). The container orchestration system 112 may scale a service in response to workloads by instantiating additional containers with service instances in response to a larger workload of the service.

In one example, a service executing on the computing cluster 110 may process data from an external data source. For example, the service may retrieve data from data source 155 of a computing device 150. Although a single computing device 150 is depicted, data source 155 may be distributed among multiple computing devices (e.g., in cloud storage). To process the data source, the service may separate the data source 155 into multiple partitions. The service instances 126A-C of the service may each process one or more of the partitions of the data source 155 in parallel.

In one example, the container orchestration system 112 may include a partition balancing module 114. The partition balancing module 114 may balance the selection of data partitions of the data source 155 among the service instances 126A-D. In another example, the container orchestration system 112 may include the partition balancing module in each of the service instances 126A-D or in the container 124A-D for each of service instances 126A-B. The partition balancing module 114 may query the compute nodes 120A, the pods 122A-B, the containers 124A-D, and/or the service instances 126A-D to identify how many service instances are executing on the computing cluster 110 for processing the data source 155. For example, an API of the partition balancing module 114 may identify each of the service instances 126A-D of a particular service on the computing cluster 110. Additionally, the partition balancing module 114 may query the data source 155 to determine how many partitions that are included in the data source 155 to be processed by the service instances 126A-D. In another example, the partition balancing module 114 may query another component of the container orchestration system 112 (e.g., a configurations file, or the like) to determine how many partitions are included in the data source 155. In another example, the partition balancing module 114 or other component of the container orchestration system 112 may partition the data source 155 using a partitioning algorithm or other method.

After determining the number of service instances 126A-D executing on the computing cluster 110 and the number of partitions of the data source 155, the partition balancing module 114 may determine an optimized distribution of the data partitions of the data source to be assigned to the service instances 126A-D. For example, the partition balancing module 114 may calculate a maximum multiple (i.e., threshold multiple) of the number of service instances 126A-D that is less than the number of data partitions of the data source 155. The partition balancing module 114 may then separate the partitions into a first group including the threshold multiple number of data partitions and a second group including all of the remaining data partitions left over. The partition balancing module 114 may then calculate a target number, also referred to herein as a partition quota, of partitions to be assigned or claimed by each of the service instances 126A-D. In one example, the partition balancing module 114 may then assign the partition quota number of data partitions of the data source 155 to each of the service instances 126A-D to be processed. The partition balancing module may also assign up to one data partition from the second group of remaining partitions to each of the service instances 126A-D. At least one of the service instances 126A-D will not be assigned a partition from the second group of remaining partitions. In another example, each service instance 126A-D may claim the quota number of data partitions (e.g., via a lease associated with a partition) to process. Each service instance 126A-D may attempt to claim one data partition from the second group of remaining partitions until all of the partitions in the second group are claimed. The number of partitions in the second group of remaining partitions may be less than the number of service instances. Therefore, at least one service instance 126A-D may not be able to claim a data partition from the second group of data partitions. The partition balancing module 114 may continuously or periodically perform rebalancing of the data partitions, as described below with respect to FIGS. 3A and 3B.

Figure 2:
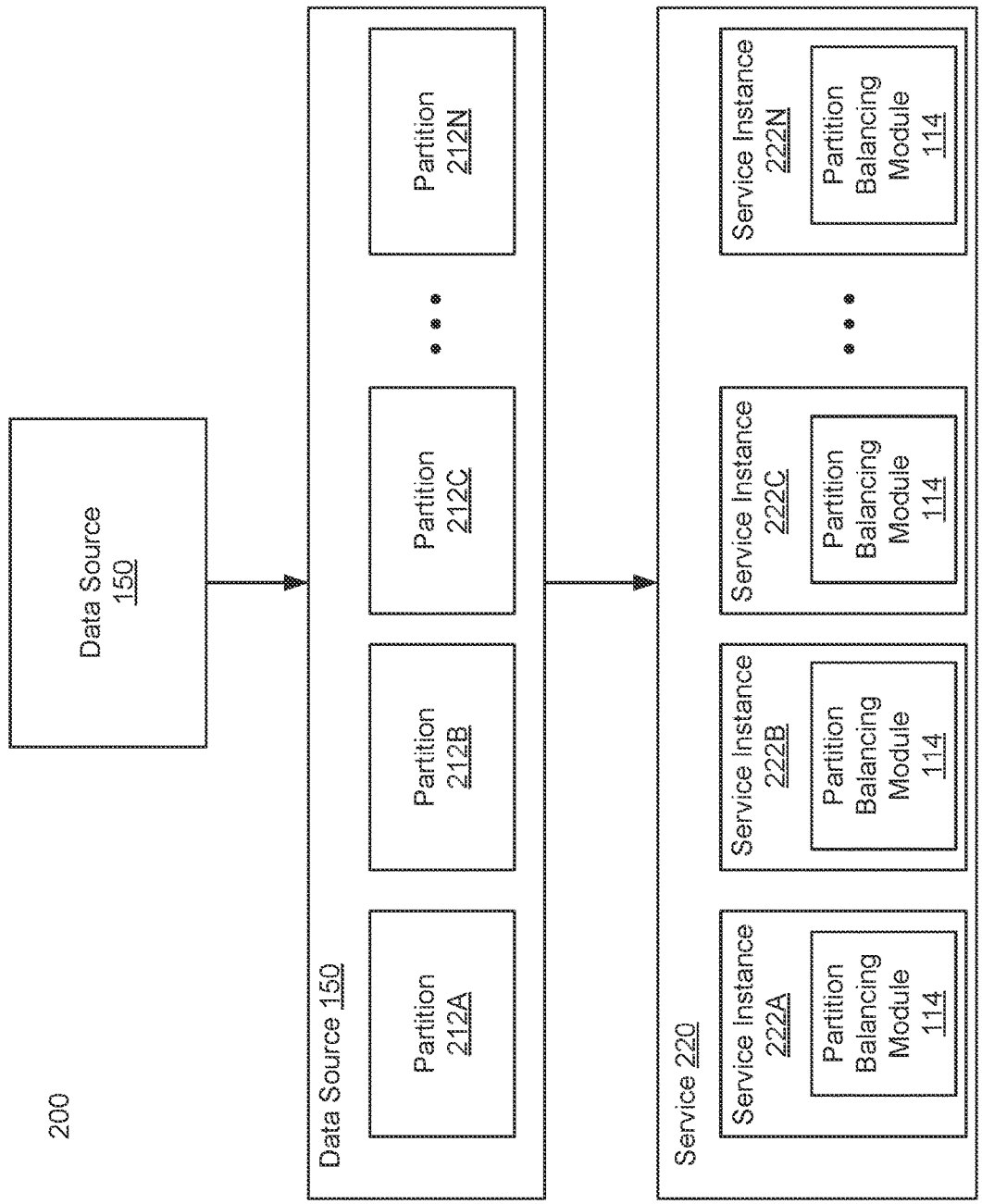
FIG. 2 is a block diagram illustrating an example system for partitioning a data source to be processed by service instances, according to embodiments of the present disclosure.

FIG. 2 is a block diagram illustrating an example system 200 for partitioning a data source to be processed by service instances, according to embodiments of the present disclosure. As depicted, a service 220 of a computing cluster may retrieve data from a data source 150. Data source 150 may be the same or similar to data source 150 as described with respect to FIG. 1. The data source 150 may be partitioned into N partitions (e.g., by the service 220, a component of a container orchestration system, or a computing device associated with the data source 150) to be processed by the service 220. Multiple service instances 222A-N may be instantiated for the service 220 to process the data partitions 212A-N. Each service instance 222A-N may include a partition balancing module 114 for selecting and claiming partitions 212A-N to be processed by each of the service instances 222A-N. For example, each service instance 222A-N may claim and process one or more of the partitions 212A-N. Although not depicted in FIG. 2, each service instance 222A-N may be included in a container instantiated and managed by a container orchestration system as described with respect to FIG. 1. Additionally, because the partitions can change dynamically during the life of the service 220 and the number of service instances 222A-N may also change dynamically, the partition balancing module 114 may continuously or periodically re-balance the partitions 212A-N among the service instances 222A-N, as described below with respect to FIGS. 3A and 3B.

In one example, each partition 212A-N may be associated with a lease that may be claimed be one of the service instances 222A-N. A lease may be a resource provided by a cloud platform, container orchestration system, or any external system that can be owned by a service instance. A lease may be owned by a single instance at any point in time. A lease may act as a lock that can be owned by an instance for a limited amount of time, during which the owning instance is allowed to renew the lease, otherwise the lease may expire. An instance may yield a lease or a timeout may release the lease (e.g., if the instance has failed or is otherwise not processing the partition). By claiming the lease associated with a partition 212A-N, a single service instance 222A-N may alone process the partition 212A-N. The service instance 222A-N may start consuming the partition once the corresponding lease has been claimed for the time the lease is held by the service instance. A service instance will stop data processing from the partition prior to yielding the lease or prior to expiration of the lease.

Additionally, the partition balancing module 114 of each service instance 222A-N may sort the partitions 212A-N and assign each partition 212A-N and its corresponding lease an ordinal value. Each partition balancing module 114 may use the same sorting algorithm (e.g., alphabetic sorting, based on numeric identifiers, etc.) so all service instances 222A-N assign the same ordinal value to the partitions 212A-N (e.g., p(1), p(2), p(3), etc.) and therefore all service instances 222A-N may have the same view of the partitions 212A-N. Additionally, the ordinal values may allow the service instances 222A-N to discover which partitions 212A-N have already been claimed by one of the other service instances 222A-N and which partitions 212A-N remain available.

In one example, the partition balancing module 114 for each service instance 222A-N may determine how many partitions (k) are included in data source 150 and how many service instances (n) of the service 220 are instantiated to process the data source 150. The partition balancing module 114 may then calculate a threshold multiple (t) defined as the maximum multiple of the number of service instances (n) that is less than the number of partitions (k). That is the maximum multiple of n that satisfies ($t=n*x \leq k$) where x is a positive integer.

The partition balancing module 114 may then separate the partitions 212A-N into a main set (M) of partitions comprised of the threshold multiple (t) number of partitions and a remainder set (R) comprised of the remaining partitions that are not included in the main set (M). The partition balancing module 114 may then determine a target number ($Q_m$) of partitions from the main set (M) that is to be claimed by each service instance 222A-N. The partition balancing module 114 may then claim, on behalf of the corresponding service instance, the target number ($Q_m$) of partitions from the main set (M) and attempt to claim up to one partition from the remainder set (R). Each service instance 222A-N may attempt to claim an available partition from the main set until it has claimed the target number of partitions from the main set. Additionally, each service instance 222A-N may attempt to claim a partition from the remainder set (R) if any partitions of the remainder set (R) remain available. Thus, the service instances 222A-N may compete to claim the partitions of the remainder set (R) until all of the partitions of the remainder set (R) are claimed.

Several example configurations and the resulting partition assignments are presented below.

| Example # | # of Partitions (k) | # of Instances (n) | Threshold Multiple (t) | Main Set (M) | Remainder Set (R) | Target Number ($Q_m =$ t/n) |
|---|---|---|---|---|---|---|
| 1 | 3 | 1 | 3 | {p(1), p(2), p(3)} | { } | 3 |
| 2 | 3 | 2 | 2 | {p(1), p(2)} | {p(3)} | 1 |
| 3 | 4 | 3 | 3 | {p(1), p(2), p(3)} | {p(4)} | 1 |
| 4 | 8 | 3 | 6 | {p(1), p(2), p(3), p(4), p(5), p(6)} | {p(7), p(8)} | 2 |
| 5 | 10 | 3 | 9 | {p(1), p(2), p(3), p(4), p(5), p(6), p(7), p(8), p(9)} | {p(10)} | 3 |

According to Example 1 above, data source 150 may include three data partitions (k=3) and one service instance (n=1) may be instantiated for the service 220. Accordingly, the threshold multiple may be calculated to be three. The target number may thus be calculated as three (t/n=3). Therefore, the optimal distribution of partitions will be three partitions from the main set to each service instance with the remainder set being empty.

According to Example 2 above, data source 150 may include three data partitions (k=3) and two service instances (n=2) may be instantiated for the service 220. Accordingly, the threshold multiple may be calculated to be two and two partitions will be included in the main set (M). Therefore, the target number may be calculated to be one (t/n=1). Accordingly, each service instance may own one data partition from the main set. The remaining set may include one partition (i.e., p(3)) for which the two service instances may compete. Only one of the two instances may claim the p(3) partition of the remainder set (R). Therefore, one of the instances will own one partition and the other instance will own two.

According to Example 3 above, data source 150 may include four data partitions (k=4) and three service instances (n=3) may be instantiated for the service 220. Accordingly, the threshold multiple may be calculated to be three and three partitions will be included in the main set (M). Therefore, the target number may be calculated to be one (t/n=1). Thus, each service instance may own one partition from the main set. The three instances may compete for the one partition p(4) in the remainder set (R) resulting in two instances owning one partition and the third instance owning two partitions.

According to Example 4 above, data source 150 may include eight partitions (k=8) and three service instances (n=3) may be instantiated for the service 220. Accordingly, the threshold multiple may be calculated to be six (t=6) and six partitions will be included in the main set (M). Therefore, the target number may be calculated to be two (t/n=2). Thus, each service instance may own two partitions from the main set (M). The eight instances may compete for the two partitions p(7) and p(8) in the remainder set (R) resulting in one instance owning two partitions and two instances owning three partitions (i.e., two from the main set and one from the remainder set).

According to Example 5 above, data source 150 may include ten partitions (k=10) and three service instances (n=3) may be instantiated for the service 220. Accordingly, the threshold multiple may be calculated to be nine (t=9) and nine partitions may be included in the main set (M). Therefore, the target number may be calculated to be three (t/n=3). Thus, each service instance may own three partitions from the main set (M). The ten instances may compete for the single partition p(10) of the remainder set (R) resulting in nine instances owning three partitions and one instance owning four partitions. As can be seen, the variance in the number of partitions to signed to the instances in each of the above examples is minimized (i.e., a maximum variance of one across all instances).

Figure 3A:
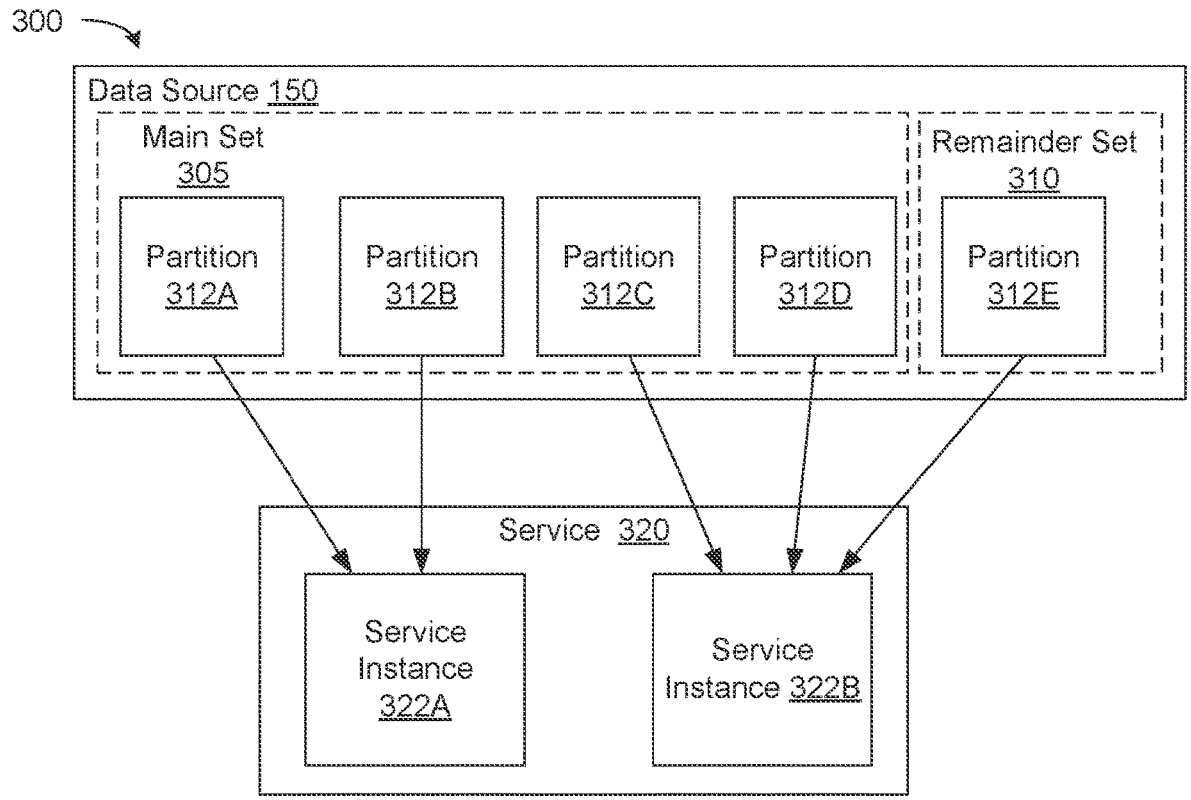
FIG. 3A is a block diagram illustrating an example configuration of a system for balancing data partitions of a data source across service instances, according to embodiments of the present disclosure.

FIG. 3A is a block diagram illustrating an example configuration 300 of a system for balancing data partitions of a data source across service instances, according to embodiments of the present disclosure. In configuration 300, the data source 150 has been partitioned into five data partitions 312A-E. Additionally, the service 320 may include two service instances 322A-B to process the data partitions 312A-E. Each service instance 322A-B may include a partition balancing module (e.g., partition balancing module 114 described with respect to FIG. 2). The partition balancing module for each of the service instances 322A-B may retrieve the number of partitions of the data source and a total number of service instances currently executing on a computing cluster. For example, the partition balancing module may use an API for discovering other instances of the service. Accordingly, after a sufficient period of time if the number of service instances and partitions remains consistent, each service instance 322A-B may share a consistent view of the system. The partition balancing module for each service instance 322A-B may then calculate the number of data partitions to claim from the available data partitions.

In one example, the partition balancing module 114 may split the data partitions into two groups. The first group (e.g., the main set 305) may include the maximum multiple of the number of service instances (i.e., threshold multiple). For example, because configuration 300 includes two service instances 322A-B and five data partitions 312A-E, the threshold multiple is four (i.e., the integer multiple of two that is less than five). The partition balancing module may include the first four partitions of the data source in the first group (i.e., the main set 305) and the remaining partition into the second group (i.e., remainder set 310). The partition balancing module may calculate a target number of partitions for a service instance to claim from the main set 305 by dividing the threshold multiple by the number of service instances. The partition balancing module of each service instance 312A-E may then claim the target number of partitions from the main set 305 and attempt to claim up to one partition from the remainder set 310. Thus, in configuration 300, service instance 322A claims two partitions from the main set 305 and the service instance 322B claims two partitions from the main set 310. Additionally, both service instances 322A and 322B may attempt to claim the partition of the remainder set 310. In the depicted configuration 300, service instance 322B claims the partition of the remainder set 310 and thus service instance 322A does not acquire a partition from the remainder set 310.

In one example, claiming a partition may include taking possession of a partition or a lease associated with a partition by a service instance. By taking possession of the partition, the service instance may acquire exclusive rights to process to the data of the partition. For example, when a service instance claims a partition, or the lease of a partition, the service instance may be the only service instance allowed to process the data from the partition until the service instance releases the claim on the partition, or the lease expires.

Figure 3B:
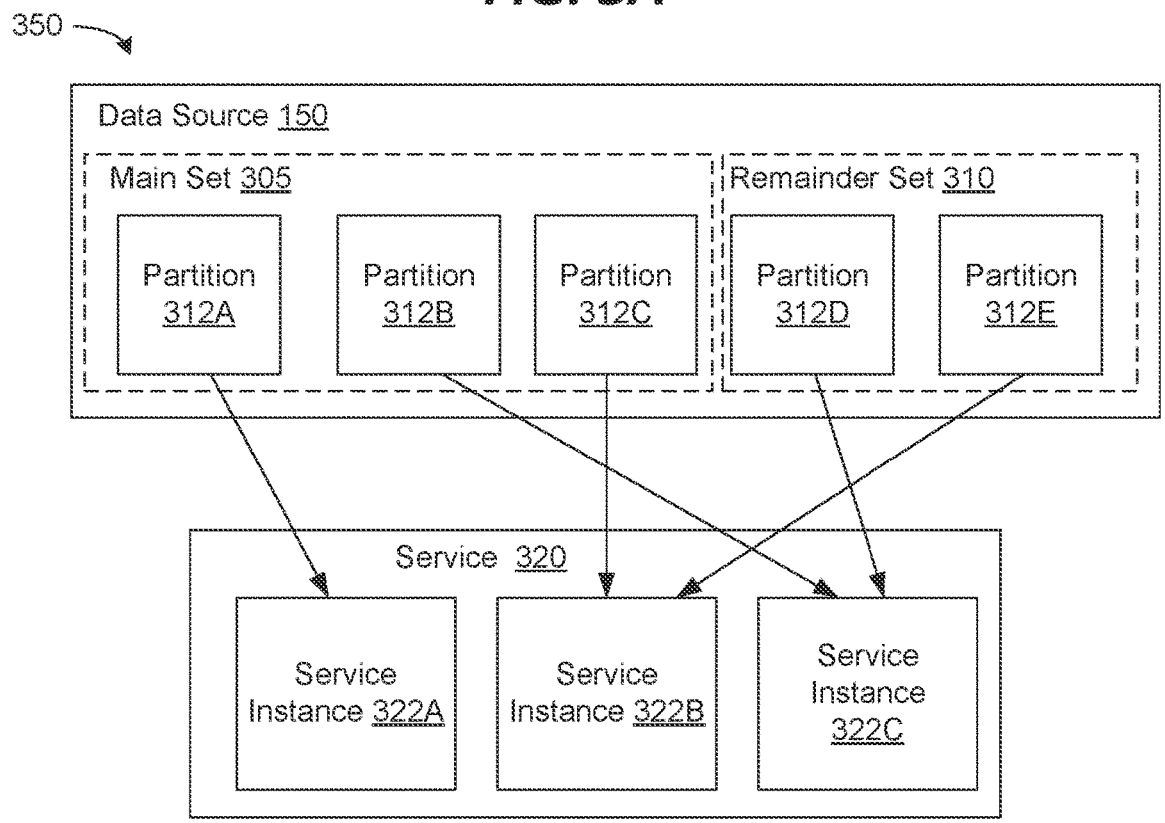
FIG. 3B is a block diagram illustrating an example configuration of a system for balancing data partitions of a data source across service instances, according to embodiments of the present disclosure.

FIG. 3B is a block diagram illustrating an example configuration 350 of a system for balancing data partitions of a data source across service instances, according to embodiments of the present disclosure. The configuration 350 may be similar to the configuration 300 with the addition of service instance 322C. For example, the service 320 may be dynamically scalable and may instantiate additional service instances to process the workload. Thus, because the service instance 322C is newly instantiated, the partitions may need to be rebalanced across the three service instances 322A-C to maximize processing efficiency.

In one example, the partition balancing module (e.g., partition balancing module 114 of FIG. 2) of each of each service instance 322A-C may again determine the number of partitions 312A-E and the number of service instances 322A-C as well as calculate the threshold multiple, the main set, the remainder set, and the target number of partitions to be claimed from the main set. In the depicted example, because there are five partitions and three service instances, the threshold multiple is three and therefore the target number of partitions of the main set to be owned by each service instance is one. Accordingly, each of service instance 322A and 322B may release a claim on one of the partitions that it previously owned from the main set 305 in configuration 300 (i.e., service instance 322A may release partition 312 B and service instance 322B may release 312D). Thus, partition 312B may become available in the main set 305 for service instance 322C to acquire. Thus, each of the service instances 322A converge at one partition claimed from the main set. Additionally, service instance 322A and service instance 322C may each attempt to acquire up to one partition from the remainder set. Although the service instance 322C is depicted as claiming the available partition 312D from the remainder set, in an alternative example, service instance 322A may have claimed the partition 312D. Therefore, every service instance has claim either one or two partitions and the variance across service instances 322A is minimized.

In another example, upon a change in the configuration (e.g., change in number of partitions or service instances) each service instance may release the claims on the partitions from the previous configuration and newly select partitions.

Figure 4:
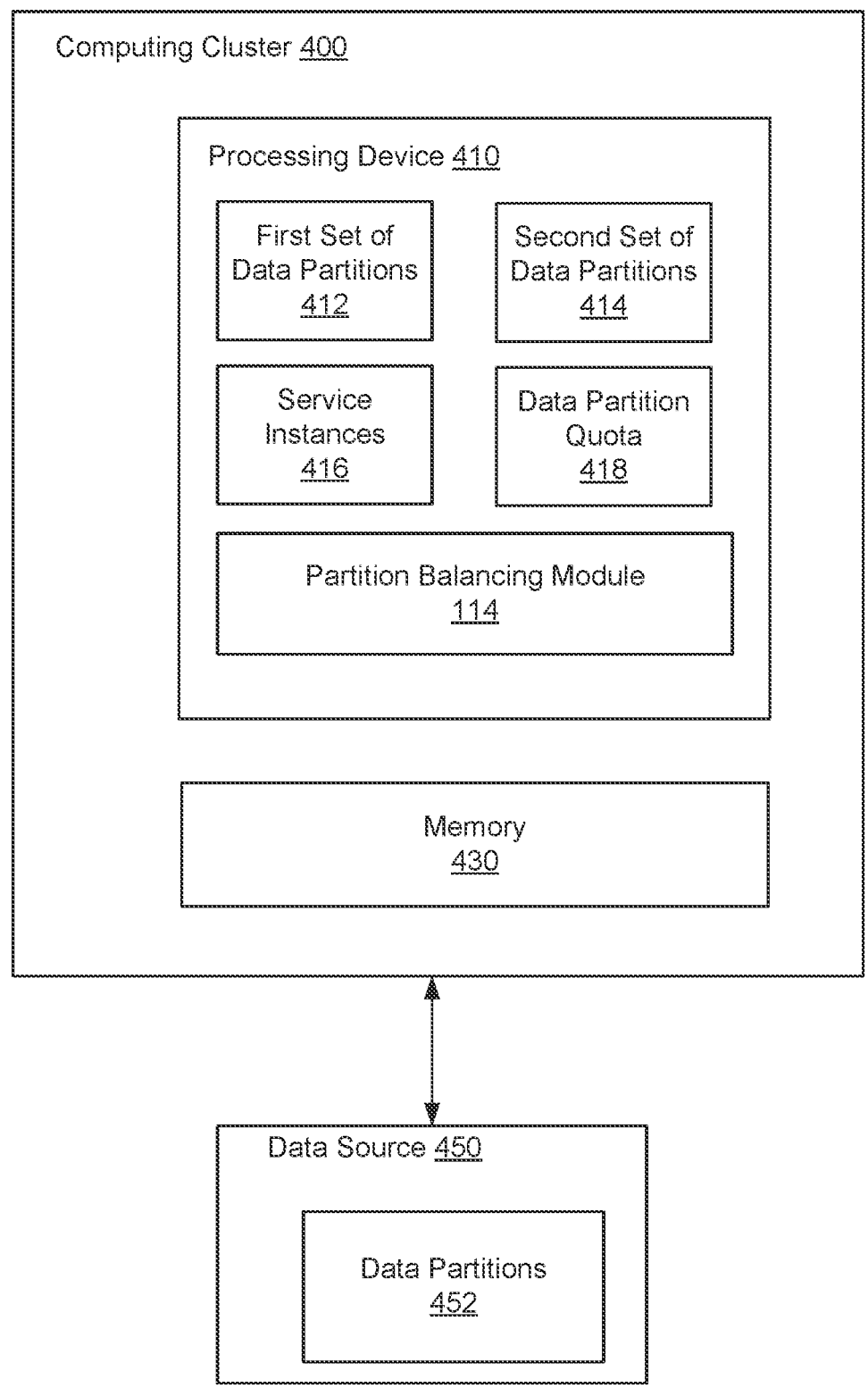
FIG. 4 is a block diagram of an example computing device that may implement one or more of the operations described herein, in accordance with some embodiments of the present disclosure.

FIG. 4 is a block diagram illustrating an example computing cluster 400 for balancing data partitions of a data source across service instances, according to embodiments of the present disclosure. Computing cluster 400 includes a processing device 410 and a memory 420. Memory 420 may include volatile memory devices (e.g., random access memory (RAM)), non-volatile memory devices (e.g., flash memory) and/or other types of memory devices. Processing device 410 may include a partition balancing module 114 (e.g., included in a container orchestration system and/or in each service instance 416), a first set of data partitions 412, a second set of data partitions 414, service instances 416, and data partition quota 418. Computing cluster 400 may be coupled to a data source 450 that includes one or more data partitions 452.

Partition balancing module 114 may determine a number of service instances 416 executing on the computing cluster 400. The partition balancing module 114 may also determine how many data partitions 452 are included in the data source 450. The partition balancing module may then separate the data partitions 452 into a first set of data partitions 412 and a second set of data partitions 414 based on the number of service instances 416 and the number of data partitions 452. The partition balancing module 114 may determine a data partition quota 418 for each of the services instances to claim from the first set of data partitions. Each of the service instances 416 may then claim the data partition quota 418 from the first set of data partitions 412 and up to one partition from the second set of data partitions 414. Each service instance 416 may the process the claimed data partitions.

Figure 5:
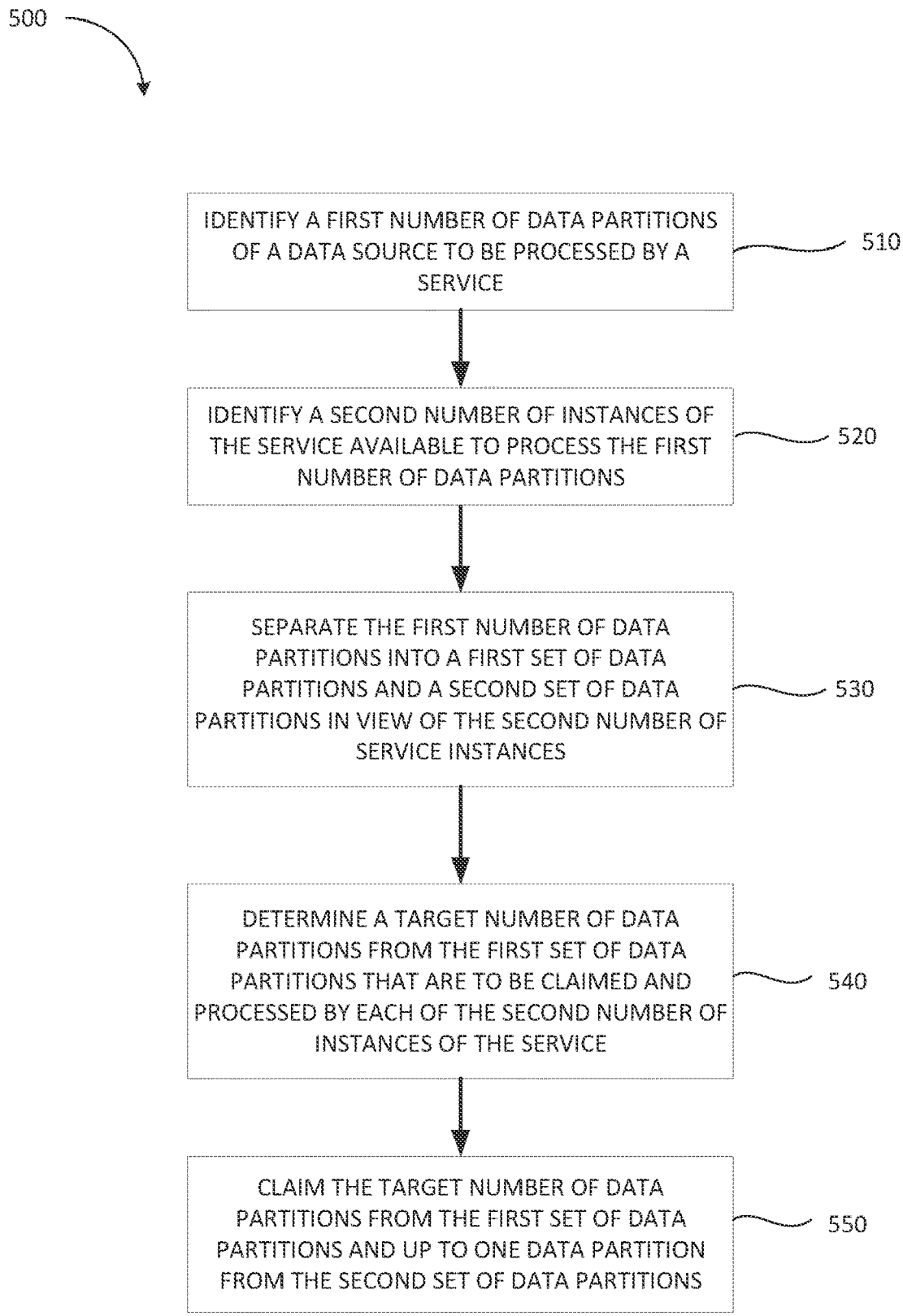
FIG. 5 is a flow diagram of an example method of balancing data partitions among service instances of dynamic cloud services, in accordance with some embodiments of the present disclosure.

FIG. 5 is a flow diagram of a method 500 of balancing data partitions among service instances of dynamic cloud services, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by partition balancing module 114 as described with respect to FIG. 1 or FIG. 2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where processing logic identifies a number of data partitions of a data source to be processed by a service. At block 520, the processing logic identifies a number of instances of the service available to process the data partitions. For example, the processing logic may discover other instances of the service. At block 530, the processing logic separates the data partitions into a first set of data partitions and a second set of data partitions in view of the number of service instances and the number of data partitions.

At block 540, the processing logic calculates a target number of data partitions from the first set of data partitions that are to be claimed and processed by each of the instances of the service. In one example, the processing logic determines whether a third number of data partitions owned from the first set of data partitions is less than, greater than, or equal to the target number of data partitions. In response to determining that the third number of data partitions owned from the first set of data partitions is less than the target number of data partitions the processing logic may search for an available data partition in the first set of data partitions and claim, for the instances of the service, the available data partition from the first set of data partitions. In one example, in response to determining by the first instance of the service that the third number of data partitions owned from the first set of data partitions is greater than the target number of data partition, the processing logic may select a data partition from the first set of data partitions that is owned by the first instance of the service and release a claim of the data partition.

At block 550, the processing logic claims the target number of data partitions from the first set of data partitions and up to one data partition from the second set of data partitions. In one example, each of the first number of data partitions is associated with an ordinal value and wherein claiming an available data partition comprises claiming the lease associated with the ordinal value of the available data partition. In one example, to claim a partition from the second set, the processing logic may determine whether the first instance of the service owns a data partition from the second set of data partitions and determine whether at least one data partition of the second set of data partitions is available. In response to determining that the first instance of the service does not own a data partition from the second set of data partitions and that at least one data partition of the second set of data partitions is available, the processing logic may claim one of the at least one data partitions of the second set of data partitions that is available. In one example, each data partition of the first number of data partitions is associated with a lease. To claim a partition, the processing logic may claim the lease associated with the data partition.

In one example, claiming a partition may include taking possession of a partition or a lease associated with a partition by a service instance. By taking possession of the partition, the service instance may acquire exclusive rights to process to the data of the partition. For example, when a service instance claims a partition, or the lease of a partition, the service instance may be the only service instance allowed to process the data from the partition until the service instance releases the claim on the partition, or the lease expires.

Figure 6:
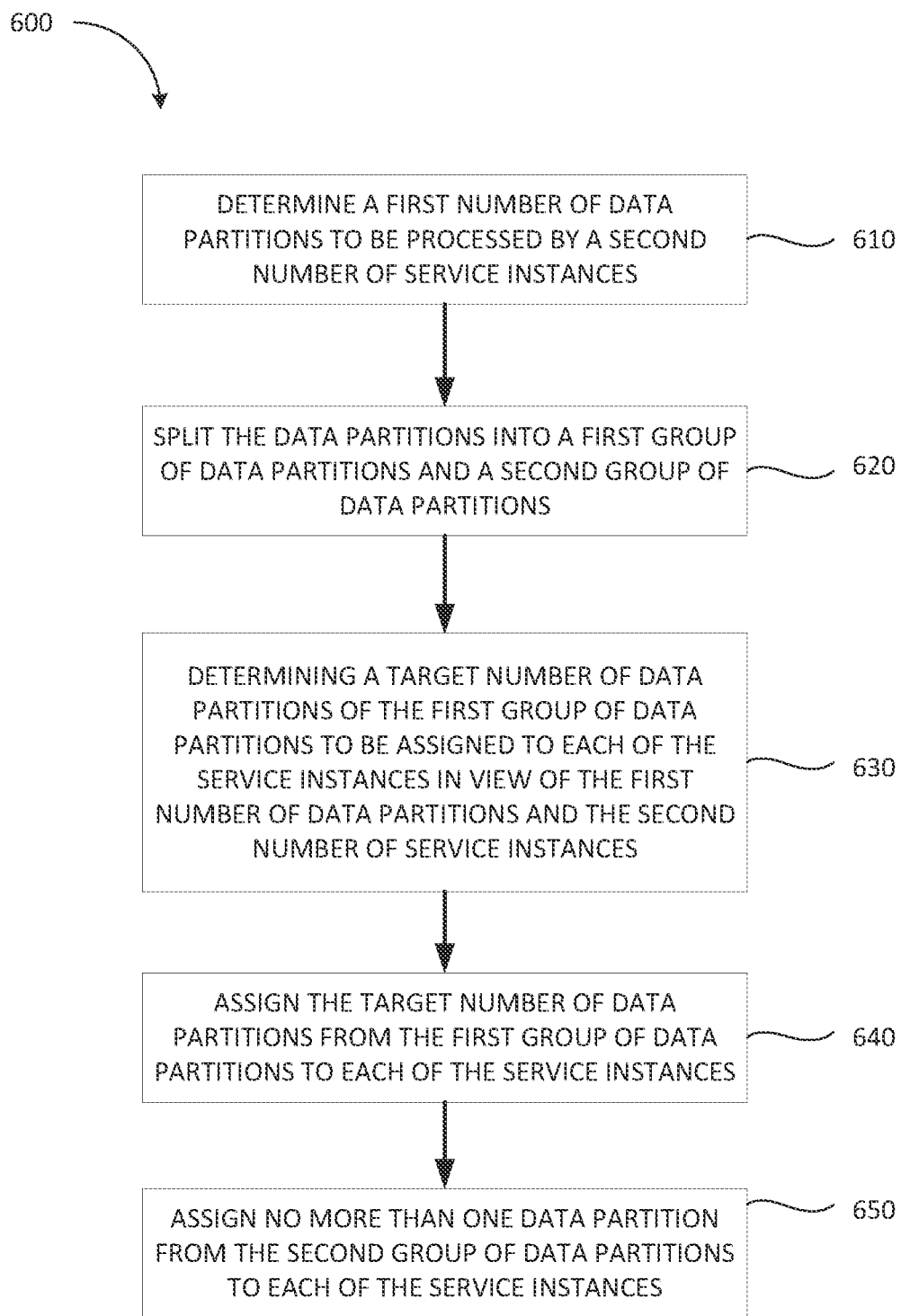
FIG. 6 is a flow diagram of another example method of balancing data partitions among service instances of dynamic cloud services, in accordance with some embodiments of the present disclosure.

FIG. 6 is a flow diagram of a method 600 of balancing data partitions among service instances of dynamic cloud services, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by partition balancing module 114 as described with respect to FIG. 1 or FIG. 2.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where processing logic determines a first number of data partitions to be processed by a second number of service instances. At block 620, the processing logic splits the data partitions into a first group of data partitions and a second group of data partitions. In one example, the processing logic calculates a third number of data partitions equal to a maximum multiple of the second number of service instances that is less than the first number of data partitions.

At block 630, the processing logic determines a target number of data partitions of the first group of data partitions to be assigned to each of the service instances in view of the first number of data partitions and the second number of data partitions. At block 640, the processing logic assigns the target number of data partitions from the first group of data partitions to each of the service instances. In one example, first set of data partitions are assigned evenly among the one or more service instances.

At block 650, the processing logic assigns no more than one data partitions from the second group of data partitions to each of the service instances. In one example, one or zero data partitions of the second set are assigned to each of the one or more service instances. the first set of data partitions comprises the third number of data partitions and the second set of data partitions comprises a remaining number of data partitions of the first number of data partitions.

In one example, the processing logic determines that a service instance has been assigned fewer than the target number of data partitions. In response to determining that the service instance has been assigned fewer than the target number of data partitions, the processing logic may assign an additional data partition of the first set of data partitions to the service instance. In another example, the processing logic may determine that a service instance has been assigned more than the target number of data partitions. In response to determining that the service instance has been assigned more than the target number of data partitions, the processing logic may release at least one data partition assigned to the service instance. In another example, processing logic determines whether all data partitions of the second set have been assigned to a service instance. In response to determining that at least one data partition has not been assigned to a service instance, the processing logic assigns a data partition of the second set to a service instance that has not been assigned a data partition of the second set.

In one example, the number of services instances may be dynamically changed. Accordingly, the processing logic may determine that the first number of service instances has changed to a second number of service instances and update the first set of data partitions and the second set of data partitions in view of the second number of service instances.

Figure 7:
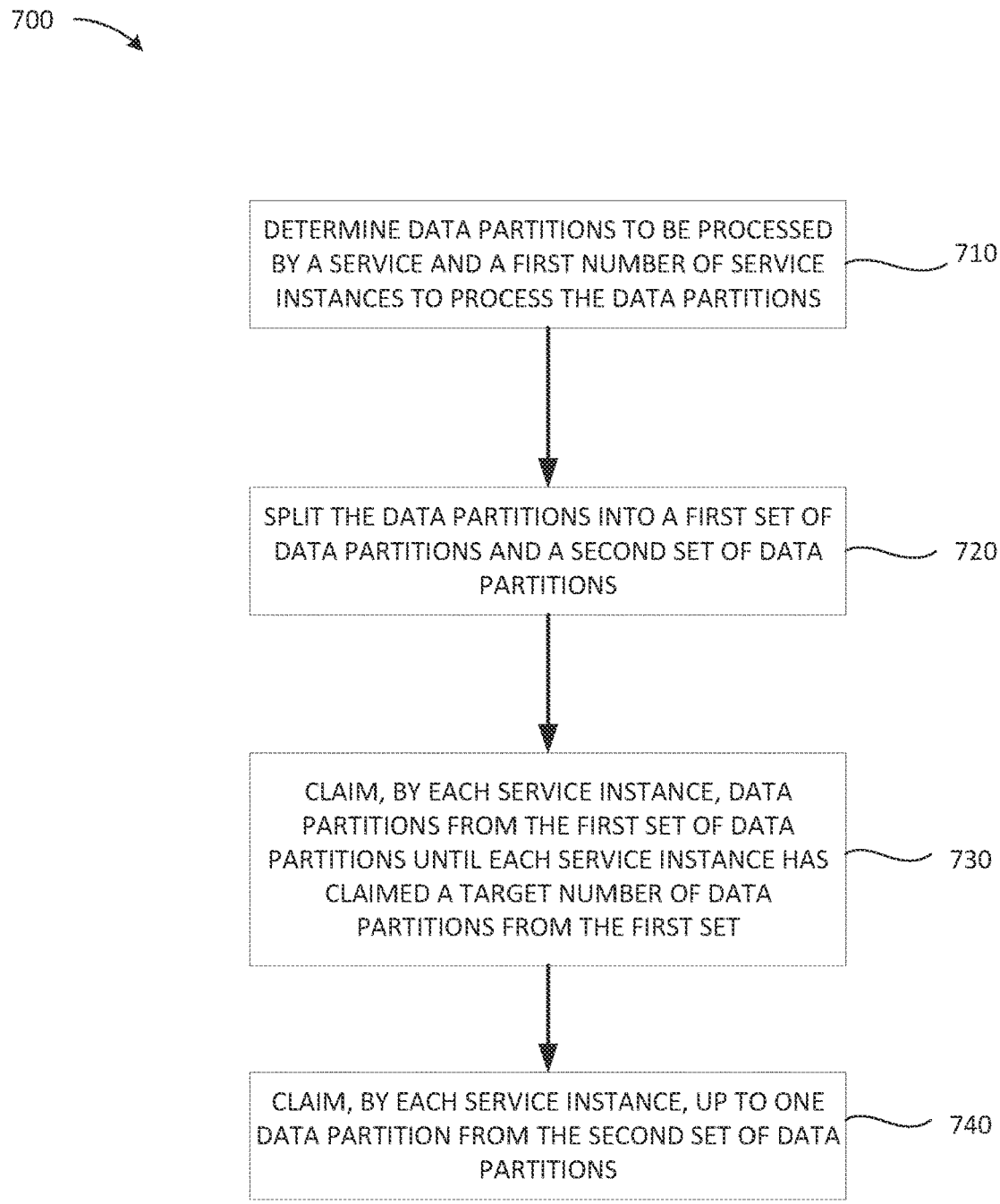
FIG. 7 is a flow diagram of another example method of balancing data partitions among service instances of dynamic cloud services, in accordance with some embodiments of the present disclosure.

FIG. 7 is a flow diagram of a method 700 of balancing data partitions among service instances of dynamic cloud services, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by partition balancing module 114 as described with respect to FIGS. 1 and 2.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where processing logic determines data partitions to be processed by a service and a first number of service instances available to process the data partitions.

At block 720, the processing logic splits the data partitions into a first set of data partitions and a second set of data partitions. In one example, the processing logic may calculate a maximum multiple of the first number of service instances less that is less than a number of the plurality of data partitions and group the maximum multiple number of data partitions into the first set of data partitions and all remaining data partitions into the second set of data partitions.

At block 730, the processing logic claims, for each service instance, data partitions from the first set of data partitions until each service instance has claimed a target number of data partitions from the first set of data partitions. In one example, processing logic determines the target number of data partitions of the first set of data partitions to be claimed by each service instance in view of a number of the plurality of data partitions and the first number of service instances.

At block 740, the processing logic claims, for each service instance, up to one data partition from the second set of data partitions. In one example, claiming the data partitions comprises claiming a lease associated with a data partition to the service instance to process data from the data partition.

Figure 8:
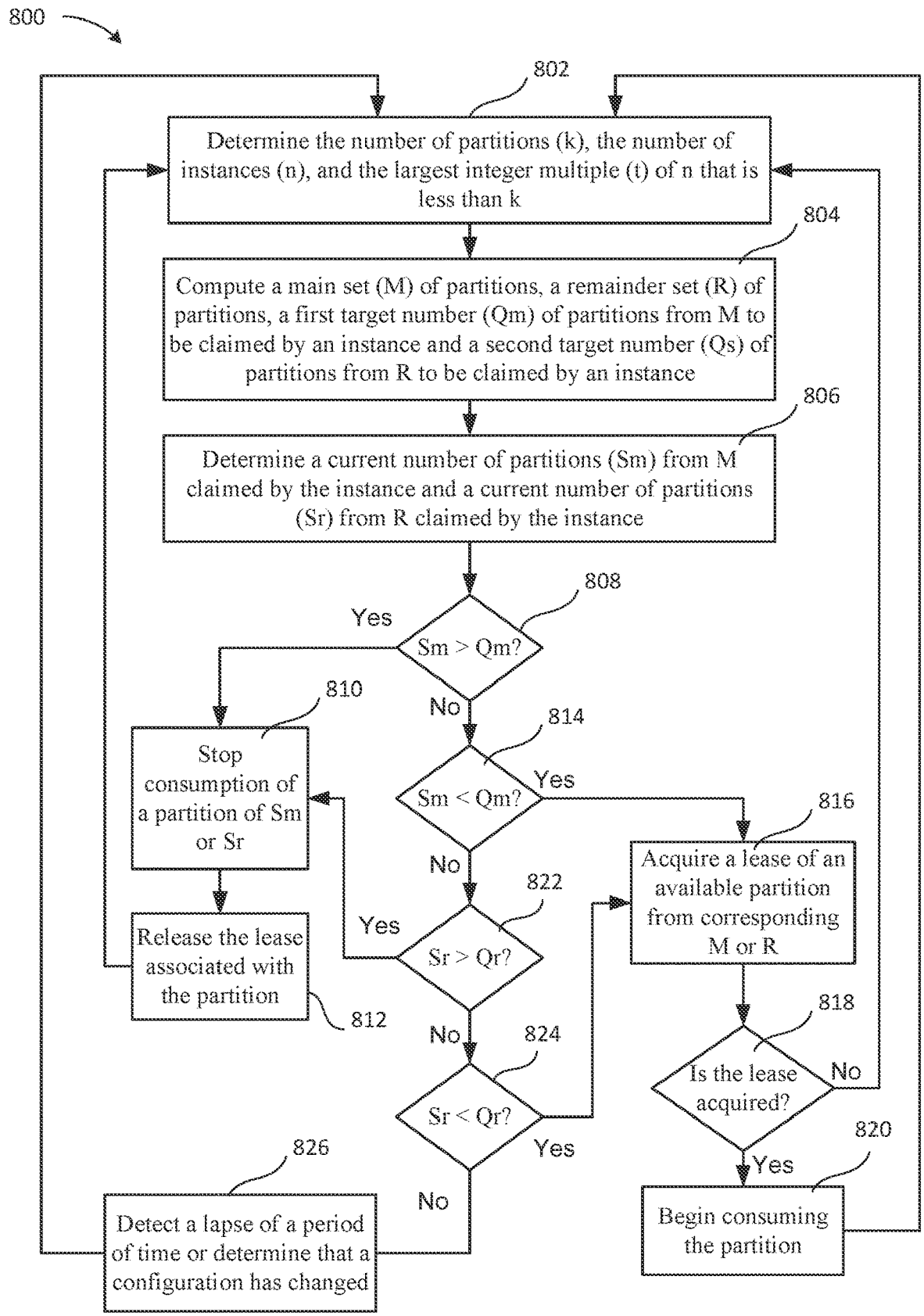
FIG. 8 is a flow diagram of another example method of balancing data partitions among service instances of dynamic cloud services, in accordance with some embodiments of the present disclosure.

FIG. 8 is a flow diagram of a method 800 of balancing data partitions among service instances of dynamic cloud services, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by partition balancing module 114 as described with respect to FIGS. 1 and 2.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 802 wherein processing logic (e.g., a partition balancing module of a service instance) determines the number of partitions (k) of a data source, the number of instances (n) of a service, and a largest integer multiple (t) of the number of instance (n) that is less than the number of partitions (k).

At block 804, the processing logic computes a main set (M) of partitions of data source, a remainder set (R) of partitions of the data source, a first target number (Qm) of partitions from M to be claimed by the instance, and a second target number (Qs) of partitions from R to be claimed by an instance.

At block 806, the processing logic determines a current number of partitions (Sm) from the main set (M) that is currently claimed by the instance and a current number of partitions (Sr) from the remainder set (R) that is currently claimed by the instance.

At block 808, the processing logic may determine whether the current number of partitions (Sm) claimed from the main set (M) is greater than the target number (Qm) of partitions that the instance is supposed to claim from the main set (M). If the current number of partitions (Sm) from the main set (M) is greater than the target number (Qm), the method proceeds to block 810, where processing logic stops consumption of a partition of Sm. At block 812, the processing logic then releases the lease associated with the selected partition and the method returns to block 802.

If the current number of partitions (Sm) claimed from the main set (M) is not greater than the target number (Qm), the method continues to block 814, where the processing logic determines whether the current number of partitions (Sm) is less than the target number (Qm). If the current number of claimed partitions (Sm) from the main set (M) is less than the target number (Qm), the method proceeds to block 816 where the processing logic acquires a lease of an available partition from the main set M. At block 818, the processing logic determines whether the lease has successfully been acquired by the instance. If the lease is successfully acquired, at block 820 the processing logic (e.g., the instance) begins consuming the partition. Otherwise, the method returns to block 802.

If the current number of partitions (Sm) claimed from the main set (M) is not less than the target number (Qm), then the number of claimed partitions (Sm) is equal to the target number (Qm) and the method continues to block 822, where the processing logic determines whether the current number of partitions (Sr) claimed from the remainder set (M) is greater than the target number (Qr) of partitions that the instance is supposed to claim from the remainder set (M). The target number (Qr) may be defined to be one if the remainder set is not empty or zero if the remainder set (R) is empty. If the current number of partitions (Sr) from the remainder set (R) is greater than the target number (Qr), the method proceeds to block 810, where processing logic stops consumption of a partition of Sr. At block 812, the processing logic then releases the lease associated with the selected partition and the method returns to block 802.

If the current number of partitions (Sr) claimed from the remainder set (R) is not greater than the target number (Qr), the method continues to block 824, where the processing logic determines whether the current number of partitions (Sr) is less than the target number (Qr). If the current number of claimed partitions (Sr) from the remainder set (R) is less than the target number (Qr), the method proceeds to block 816 where the processing logic acquires a lease of an available partition from the remainder set R. At block 818, the processing logic determines whether the lease has successfully been acquired by the instance. If the lease is successfully acquired, at block 820 the processing logic (e.g., the instance) begins consuming the partition. Otherwise, the method returns to block 802.

Figure 9:
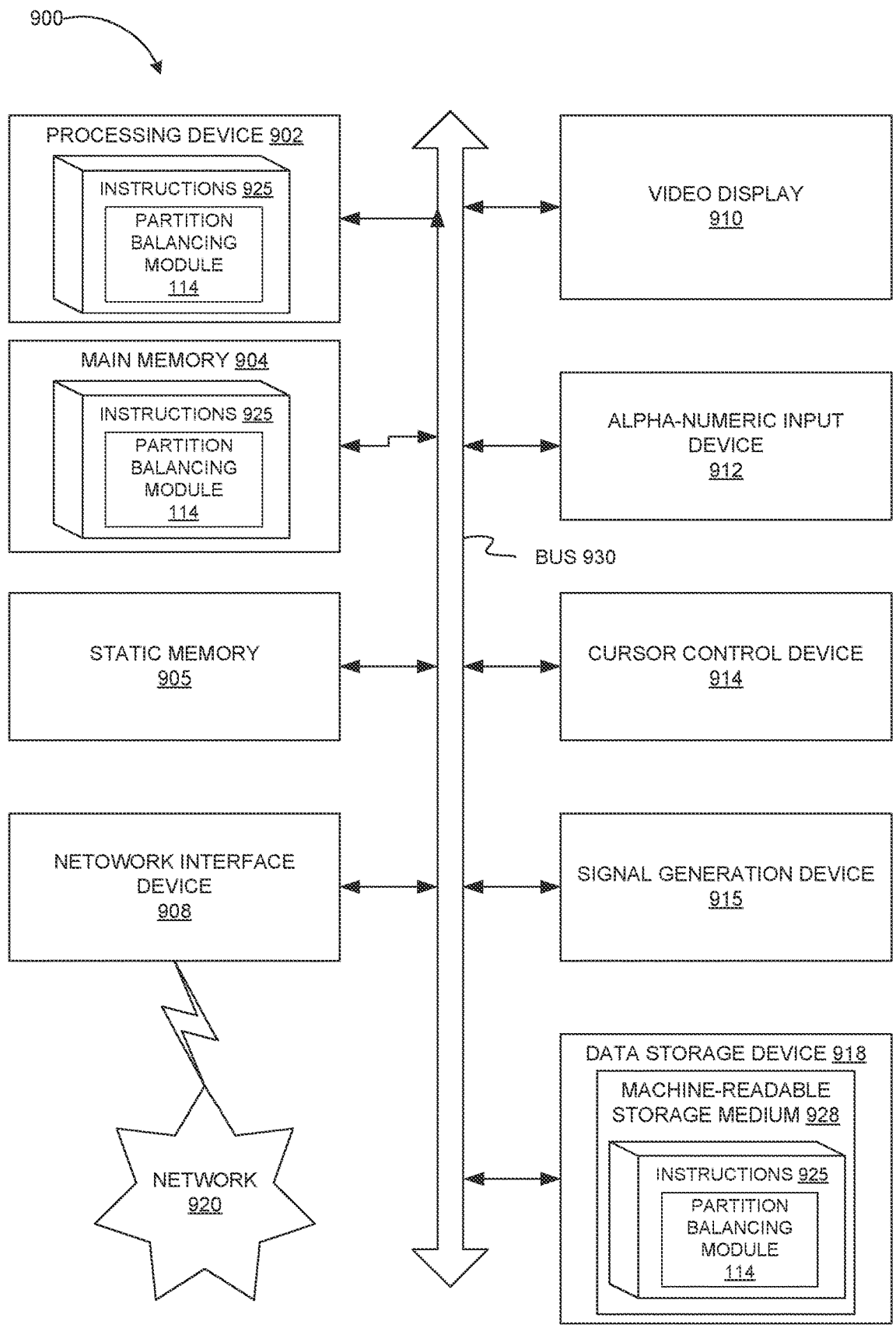
FIG. 9 is a block diagram of an example apparatus that may perform one or more of the operations described herein, in accordance with some embodiments of the present disclosure.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a partition balancing module, e.g., partition balancing module 114 for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising identifying a first number of data partitions of a data source to be processed by a service; identifying a second number of instances of the service available to process the first number of data partitions; separating, by a processing device executing a first instance of the service, the first number of data partitions into a first set of data partitions and a second set of data partitions in view of the second number of instances of the service; determining, by the first instance of the service, a target number of data partitions from the first set of data partitions to be claimed and processed by each of the second number of instances of the service; and claiming, by the first instance of the service, the target number of data partitions from the first set of data partitions and up to one data partition from the second set of data partitions.

Example 2 is the method of Example 1, wherein claiming the target number of data partitions from the first set of data partitions comprises determining whether a third number of data partitions owned from the first set of data partitions is less than, greater than, or equal to the target number of data partitions.

Example 3 is the method of Example 1 or Example 2, wherein claiming the target number of data partitions from the first set of data partitions further comprises in response to determining that the third number of data partitions owned from the first set of data partitions is less than the target number of data partitions searching for an available data partition in the first set of data partitions; and claiming the available data partition from the first set of data partitions.

Example 4 is the method of Example 1, Example 2, or Example 3, wherein claiming the target number of data partitions from the first set of data partitions further comprises, in response to determining by the first instance of the service that the third number of data partitions owned from the first set of data partitions is greater than the target number of data partitions selecting a data partition from the first set of data partitions that is owned by the first instance of the service; and releasing a claim of the data partition.

Example 5 is the method of Example 1, Example 2, Example 3, or Example 4, further comprising determining whether the first instance of the service owns a data partition from the second set of data partitions; determining whether at least one data partition of the second set of data partitions is available; and in response to determining that the first instance of the service does not own a data partition from the second set of data partitions and that at least one data partition of the second set of data partitions is available, claiming one of the at least one data partitions of the second set of data partitions that is available.

Example 6 is the method of Example 1, Example 2, Example 3, Example 4, or Example 5, wherein each data partition of the first number of data partitions is associated with a lease and wherein claiming a data partition comprises claiming the lease associated with the data partition.

Example 7 is the method of Example 1, Example 2, Example 3, Example 4, Example 5, or Example 6, wherein each of the first number of data partitions is associated with an ordinal value and wherein claiming an available data partition comprises claiming the lease associated with the ordinal value of the available data partition.

Example 8 is a system comprising a data source comprising a plurality of data partitions; a cluster of compute nodes executing one or more instances of a service to process the plurality of data partitions of the data source; a memory; and a processing device operatively coupled to the memory, the processing device to group the plurality of data partitions into a first set of data partitions and a second set of data partitions in view of a first number of data partitions in the plurality of data partitions and a second number of instances of the service executing on the cluster of compute nodes; determine a quota of data partitions from the first set of data partitions to be processed by each of the one or more instances of the service; and assign the quota of data partitions from the first set of data partitions and up to one data partition from the second set of data partitions to each of the one or more instances of the service to be processed.

Example 9 is the system of Example 8, wherein the processing device is to assign an ordinal value to each of the data partitions of the plurality of data partitions.

Example 10 is the system of Example 8, or Example 9, wherein to group the plurality of data partitions into the first set of data partitions and the second set of data partitions, the processing device is to determine a threshold number of data partitions corresponding to a maximum multiple of the second number of instances of the service that is less than the first number of data partitions; and group the threshold number of data partitions into the first set of data partitions in view of the ordinal value assigned to each of the data partitions.

Example 11 is the system of Example 8, Example 9, or Example 10, wherein each data partition is associated with a lease.

Example 12 is the system of Example 8, Example 9, Example 10, or Example 11, wherein to assign the quota of data partitions from the first set of data partitions, the processing device is to search for an available lease associated with a data partition; and assign the available lease to one of the one or more instances of the service.

Example 13 is the system of Example 8, Example 9, Example 10, Example 11, or Example 12, wherein each instance of the service is to begin consuming data from the data partition after the lease of the data partition is assigned to the instance.

Example 14 is the system of Example 8, Example 9, Example 10, Example 11, Example 12, or Example 13, wherein the processing device is further to determine that the second number of instances of the service executing on the cluster of compute nodes has changed to a third number of instances; and update the first set of data partitions and the second set of data partitions in view of the third number of instances.

Example 15 is a non-transitory computer-readable storage medium including instructions that, when executed by a processing device, cause the processing device to determine a plurality of data partitions to be processed by a first number of service instances executing on a computing cluster; split the plurality of data partitions into a first set of data partitions and a second set of data partitions; acquire, by each service instance, data partitions from the first set of data partitions until each service instance of the first number of service instances has claimed a target number of data partitions from the first set of data partitions; and acquire, by each service instance, up to one data partition from the second set of data partitions.

Example 16 is the non-transitory computer-readable storage medium of Example 15, wherein the processing device is further to determine the target number of data partitions of the first set of data partitions to be assigned to each service instance in view of the plurality of data partitions and the first number of service instances.

Example 17 is the non-transitory computer-readable storage medium of Example 15 or Example 16, wherein to claim a data partition, the processing device is to claim a lease associated with the data partition.

Example 18 is the non-transitory computer-readable storage medium of Example 15, Example 16, or Example 17, wherein the processing device is further to determine that the first number of service instances has changed to a second number of service instances; and update the first set of data partitions and the second set of data partitions in view of the second number of service instances.

Example 19 is the non-transitory computer-readable storage medium of Example 15, Example 16, Example 17, or Example 18, wherein to split the plurality of data partitions into the first set of data partitions and the second set of data partitions, the processing device is to calculate a threshold number of data partitions corresponding to a maximum multiple of the first number of service instances less that is less than a number of the plurality of data partitions; and group the threshold number of data partitions into the first set of data partitions and all remaining data partitions into the second set of data partitions.

Example 20 is the non-transitory computer-readable storage medium of Example 15, Example 16, Example 17, Example 18, or Example 19, wherein the processing device is further to calculate the target number of data partitions from the first set of data partitions to be assigned to each service instance by dividing the maximum multiple of the first number of service instances by the first number of service instances.

Example 21 is a method comprising determining a first number of data partitions to be processed by a second number of service instances of a dynamically scalable service; splitting the first number of data partitions into a first set of data partitions and a second set of data partitions; determining a target number of data partitions of the first set of data partitions to be assigned to each of the service instances of the second number of service instances in view of the first number of data partitions and the second number of service instances; and assigning the first set of data partitions and the second set of data partitions to the second number of service instances based on the target number of data partitions of the first set of data partitions to be assigned to each service instance.

Example 22 is the method of Example 21, wherein the first set of data partitions are assigned evenly among the one or more service instances, and wherein one or zero data partitions of the second set are assigned to each of the one or more service instances.

Example 23 is the method of Example 21 or Example 22, wherein splitting the data partitions comprises calculating a third number of data partitions equal to a maximum multiple of the second number of service instances that is less than the first number of data partitions.

Example 24 is the method of Example 21, Example 22, or Example 23, wherein the first set of data partitions comprises the third number of data partitions and the second set of data partitions comprises a remaining number of data partitions of the first number of data partitions.

Example 25 is the method of Example 21, Example 22, Example 23, or Example 24, wherein assigning the first set of data partitions and the second set of data partitions to the service instances comprises determining that a service instance has been assigned fewer than the target number of data partitions; and in response to determining that the service instance has been assigned fewer than the target number of data partitions, assigning an additional data partition of the first set of data partitions to the service instance.

Example 26 is the method of Example 21, Example 22, Example 23, Example 24, or Example 25, wherein assigning the first set of data partitions and the second set of data partitions to the service instances comprises determining that a service instance has been assigned more than the target number of data partitions; and in response to determining that the service instance has been assigned more than the target number of data partitions, releasing at least one data partition assigned to the service instance.

Example 27 is the method of Example 21, Example 22, Example 23, Example 24, Example 25, or Example 26, wherein assigning the first set of data partitions and the second set of data partitions to the service instances comprises determining whether all data partitions of the second set have been assigned to a service instance; and in response to determining that at least one data partition has not been assigned to a service instance, assign a data partition of the second set to a service instance that has not been assigned a data partition of the second set.

Example 28 is a method comprising determining a plurality of data partitions to be processed and a first number of service instances to process the plurality of data partitions; splitting the plurality of data partitions into a first set of data partitions and a second set of data partitions; claiming, by each service instance, data partitions from the first set of data partitions until each service instance has claimed a target number of data partitions from the first set of data partitions; and claiming, by each service instance, up to one data partition from the second set of data partitions.

Example 29 is the method of Example, 28, further comprising determining the target number of data partitions of the first set of data partitions to be claimed by a single service instance in view of on a number of the plurality of data partitions and the first number of service instances.

Example 30 is the method of Example 28 or Example 29 wherein claiming the data partitions comprises claiming a lease associated with a data partition to process data from the data partition.

Example 31 is the method of Example 28, Example 29, or Example 30 further comprising determining that the first number of service instances has changed to a second number of service instances; and updating the first set of data partitions and the second set of data partitions in view of the second number of service instances.

Example 32 is the method of Example 28, Example 29, Example 30, or Example 31, wherein splitting the plurality of data partitions into a first set of data partitions and a second set of data partitions comprises calculating a maximum multiple of the first number of service instances less that is less than a number of the plurality of data partitions; and grouping the maximum multiple number of data partitions into the first set of data partitions and all remaining data partitions into the second set of data partitions.

Example 33 is the method of Example 28, Example 29, Example 30, Example 31, or Example 32, further comprising calculating the target number of data partitions from the first set of data partitions to be assigned to each service instance by dividing the maximum multiple by the first number of service instances.

Example 34 is an apparatus comprising means for identifying a first number of data partitions of a data source to be processed by a service; means for identifying a second number of instances of the service available to process the first number of data partitions; means for separating the first number of data partitions into a first set of data partitions and a second set of data partitions in view of the second number of instances of the service; means for determine a target number of data partitions from the first set of data partitions to be claimed and processed by each of the second number of instances of the service; and means for claiming the target number of data partitions from the first set of data partitions and up to one data partition from the second set of data partitions.

Example 35 is the apparatus of Example 34, wherein claiming the target number of data partitions from the first set of data partitions comprises means for determining whether a third number of data partitions owned from the first set of data partitions is less than, greater than, or equal to the target number of data partitions.

Example 36 is the apparatus of Example 34 or Example 35, wherein claiming the target number of data partitions from the first set of data partitions further comprises in response to determining that the third number of data partitions owned from the first set of data partitions is less than the target number of data partitions means for searching for an available data partition in the first set of data partitions; and means for claiming the available data partition from the first set of data partitions.

Example 37 is the apparatus of Example 34, Example 35, or Example 36, wherein claiming the target number of data partitions from the first set of data partitions further comprises in response to determining that the third number of data partitions owned from the first set of data partitions is greater than the target number of data partitions means for selecting a data partition from the first set of data partitions that is owned by an instance of the service; and means for releasing a claim of the data partition.

Example 38 is the apparatus of Example 34, Example 35, Example 36, or Example 37, further comprising means for determining whether an instance of the service owns a data partition from the second set of data partitions; means for determining whether at least one data partition of the second set of data partitions is available; and in response to determining that the instance of the service does not own a data partition from the second set of data partitions and that at least one data partition of the second set of data partitions is available, means for claiming one of the at least one data partitions of the second set of data partitions that is available.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   identifying a first number of data partitions of a data source to be processed by a service;
   identifying a second number of instances of the service available to process the first number of data partitions;
   separating, by a processing device executing a first instance of the service, the first number of data partitions into a first set of data partitions and a second set of data partitions in view of the second number of instances of the service;
   determining, by the first instance of the service, a target number of data partitions from the first set of data partitions to be claimed by each of the second number of instances of the service; and
   claiming, by the first instance of the service, the target number of data partitions from the first set of data partitions and up to one data partition from the second set of data partitions.

2. The method of claim 1, wherein claiming the target number of data partitions from the first set of data partitions comprises:
   determining whether a third number of data partitions owned from the first set of data partitions is less than, greater than, or equal to the target number of data partitions.

3. The method of claim 2, wherein claiming the target number of data partitions from the first set of data partitions further comprises:
   in response to determining that the third number of data partitions owned from the first set of data partitions is less than the target number of data partitions:
      searching for an available data partition in the first set of data partitions; and
      claiming the available data partition from the first set of data partitions.

4. The method of claim 2, wherein claiming the target number of data partitions from the first set of data partitions further comprises:
   in response to determining by the first instance of the service that the third number of data partitions owned from the first set of data partitions is greater than the target number of data partitions:
      selecting a data partition from the first set of data partitions that is owned by the first instance of the service; and
      releasing a claim of the data partition.

5. The method of claim 1, further comprising:
   determining whether the first instance of the service owns a data partition from the second set of data partitions;
   determining whether at least one data partition of the second set of data partitions is available; and
   in response to determining that the first instance of the service does not own a data partition from the second set of data partitions and that at least one data partition of the second set of data partitions is available, claiming one of the at least one data partitions of the second set of data partitions that is available.

6. The method of claim 1, wherein each data partition of the first number of data partitions is associated with a lease and wherein claiming a data partition comprises:
   claiming the lease associated with the data partition.

7. The method of claim 6, wherein each of the first number of data partitions is associated with an ordinal value and wherein claiming an available data partition comprises claiming the lease associated with the ordinal value of the available data partition.

8. A system comprising:
a memory; and
a processing device operatively coupled to the memory, the processing device to:
identify a first number of data partitions of a data source to be processed by a service;
identify a second number of instances of the service available to process the first number of data partitions;
separate, by a first instance of the service, the first number of data partitions into a first set of data partitions and a second set of data partitions in view of the second number of instances of the service;
determine, by the first instance of the service, a target number of data partitions from the first set of data partitions to be claimed by each of the second number of instances of the service; and
claim, by the first instance of the service, the target number of data partitions from the first set of data partitions and up to one data partition from the second set of data partitions.

9. The system of claim 8, wherein to claim the target number of data partitions from the first set of data partitions, the first instance of the service is to:
determine whether a third number of data partitions owned from the first set of data partitions is less than, greater than, or equal to the target number of data partitions.

10. The system of claim 9, wherein to claim the target number of data partitions from the first set of data partitions the first instance of the service is to:
in response to determining that the third number of data partitions owned from the first set of data partitions is less than the target number of data partitions:
search for an available data partition in the first set of data partitions; and
claim the available data partition from the first set of data partitions.

11. The system of claim 9, wherein to claim the target number of data partitions from the first set of data partitions, the first instance of the service is to:
in response to determining by the first instance of the service that the third number of data partitions owned from the first set of data partitions is greater than the target number of data partitions:
select a data partition from the first set of data partitions that is owned by the first instance of the service; and
release a claim of the data partition.

12. The system of claim 8, wherein the processing device is further to:
determine whether the first instance of the service owns a data partition from the second set of data partitions;
determine whether at least one data partition of the second set of data partitions is available; and
in response to determining that the first instance of the service does not own a data partition from the second set of data partitions and that at least one data partition of the second set of data partitions is available, claim one of the at least one data partitions of the second set of data partitions that is available.

13. The system of claim 8, wherein each data partition of the first number of data partitions is associated with a lease and wherein to claim a data partition the first instance of the service is to:
claim the lease associated with the data partition.

14. The system of claim 8, wherein each of the first number of data partitions is associated with an ordinal value and wherein to claim an available data partition the first instance of the service is to claim the lease associated with the ordinal value of the available data partition.

15. A non-transitory computer-readable storage medium including instructions that, when executed by a processing device, cause the processing device to:
identify a first number of data partitions of a data source to be processed by a service;
identify a second number of instances of the service available to process the first number of data partitions;
separate, by a first instance of the service, the first number of data partitions into a first set of data partitions and a second set of data partitions in view of the second number of instances of the service;
determine, by the first instance of the service, a target number of data partitions from the first set of data partitions to be claimed by each of the second number of instances of the service; and
claim, by the first instance of the service, the target number of data partitions from the first set of data partitions and up to one data partition from the second set of data partitions.

16. The non-transitory computer-readable storage medium of claim 15, wherein to claim the target number of data partitions from the first set of data partitions, the first instance of the service is to:
determine whether a third number of data partitions owned from the first set of data partitions is less than, greater than, or equal to the target number of data partitions.

17. The non-transitory computer-readable storage medium of claim 16, wherein to claim the target number of data partitions from the first set of data partitions the first instance of the service is to:
in response to determining that the third number of data partitions owned from the first set of data partitions is less than the target number of data partitions:
search for an available data partition in the first set of data partitions; and
claim the available data partition from the first set of data partitions.

18. The non-transitory computer-readable storage medium of claim 16, wherein to claim the target number of data partitions from the first set of data partitions, the first instance of the service is to:
in response to determining by the first instance of the service that the third number of data partitions owned from the first set of data partitions is greater than the target number of data partitions:
select a data partition from the first set of data partitions that is owned by the first instance of the service; and
release a claim of the data partition.

19. The non-transitory computer-readable storage medium of claim 15, wherein the processing device is further to:
determine whether the first instance of the service owns a data partition from the second set of data partitions;
determine whether at least one data partition of the second set of data partitions is available; and
in response to determining that the first instance of the service does not own a data partition from the second set of data partitions and that at least one data partition of the second set of data partitions is available, claim one of the at least one data partitions of the second set of data partitions that is available.

20. The non-transitory computer-readable storage medium of claim 15, wherein each data partition of the first number of data partitions is associated with a lease and wherein to claim a data partition the first instance of the service is to:

claim the lease associated with the data partition.

* * * * *